(12) United States Patent  
Takaishi (10) Patent No.: US 10,638,017 B2  
(45) Date of Patent: Apr. 28, 2020

(54) IMAGE FORMING APPARATUS, IMAGE PROCESSING APPARATUS, AND NON-TRANSITORY COMPUTER READABLE MEDIUM

(71) Applicant: FUJI XEROX CO., LTD., Tokyo (JP)

(72) Inventor: Shinya Takaishi, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/914,284

(22) Filed: Mar. 7, 2018

(65) Prior Publication Data

US 2019/0068837 A1 Feb. 28, 2019

(30) Foreign Application Priority Data

Aug. 25, 2017 (JP) ................................. 2017-162247

(51) Int. Cl.
| | |
|---|---|
| *H04N 1/52* | (2006.01) |
| *H04N 1/00* | (2006.01) |
| *H04N 1/60* | (2006.01) |
| *H04N 1/54* | (2006.01) |

(52) U.S. Cl.
CPC ........... *H04N 1/52* (2013.01); *H04N 1/00015* (2013.01); *H04N 1/00023* (2013.01); *H04N 1/00034* (2013.01); *H04N 1/00087* (2013.01); *H04N 1/54* (2013.01); *H04N 1/6027* (2013.01)

(58) Field of Classification Search
CPC combination set(s) only.
See application file for complete search history.

(56) References Cited

U.S. PATENT DOCUMENTS

| | | | |
|---|---|---|---|
| 9,930,215 B2* | 3/2018 | Yoshida | ............... H04N 1/4078 |
| 10,126,694 B2* | 11/2018 | Zaima | ..................... H04N 1/00 |
| 2015/0055965 A1* | 2/2015 | Saito | .................. G03G 15/5041 |
| | | | 399/15 |
| 2019/0037085 A1* | 1/2019 | Inaba | ................. H04N 1/00267 |

FOREIGN PATENT DOCUMENTS

JP 2006-317632 A 11/2006

* cited by examiner

*Primary Examiner* — Helen Zong
(74) *Attorney, Agent, or Firm* — Sughrue Mion, PLLC (57) ABSTRACT

An image forming apparatus includes a print mechanism, an obtaining unit that obtains measurement information of gradation characteristics of the print mechanism for a specific color material, and a generating unit that generates correction information for a print density of the specific color material in accordance with the measurement information. The correction information specifies that a corrected density with respect to an input density increases monotonically in a range of densities from a correction start density to a maximum density, and the correction start density is determined in accordance with a density where gradation starts to attenuate in the measurement information.

9 Claims, 7 Drawing Sheets

| TYPE OF PAPER | TYPE OF TONER | TARGET GRADATION CHARACTERISTICS |
|---|---|---|
| PLAIN PAPER | SILVER | CHARACTERISTICS 1 |
| PLAIN PAPER | GOLD | CHARACTERISTICS 2 |
| COATED PAPER A | SILVER | CHARACTERISTICS 3 |
| ... | ... | ... |

FIG. 9

IMAGE FORMING APPARATUS, IMAGE PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-162247 filed Aug. 25, 2017.

BACKGROUND

(i) Technical Field

The present invention relates to an image forming apparatus, an image processing apparatus, and a non-transitory computer readable medium.

(ii) Related Art

Gradation characteristics of an image forming apparatus that uses an electrophotographic method or the like change with usage over time. Thus, for example, a test chart may be printed periodically, and the latest gradation characteristics are obtained by measuring densities of various portions of the printed test chart. Then, correction information on densities of color materials is generated so that the gradation characteristics approximate the gradation characteristics in the reference state of the image forming apparatus as closely as possible. When printing, a print mechanism is supplied with color materials that are included in an input image and whose densities are corrected in accordance with the correction information.

Recent image forming apparatuses that use an electrophotographic method or the like use color materials of not only process colors, such as cyan, magenta, yellow, and black, but also metallic colors, such as silver and gold.

Gradation characteristics of a print mechanism for the color materials of the process colors maintain the property of monotonic increase, in which a color material density (output gradation) that is measured using a print result increases as the color material density in image data increases, even though the gradation characteristics change with usage over time. In contrast, in the case of color materials of metallic colors, when an amount of toner per unit area increases, attenuation (a decrease) of density gradation, which is measured by using a spectrometer or the like, sometimes occurs in a shadow portion (a high-density range close to the maximum density) because of an increase in reflection or the like.

SUMMARY

According to an aspect of the invention, there is provided an image forming apparatus including a print mechanism, an obtaining unit, and a generating unit. The obtaining unit obtains measurement information of gradation characteristics of the print mechanism for a specific color material. The generating unit generates correction information for a print density of the specific color material in accordance with the measurement information. The correction information specifies that a corrected density with respect to an input density increases monotonically in a range of densities from a correction start density to a maximum density, and the correction start density is determined in accordance with a density where gradation starts to attenuate in the measurement information.

BRIEF DESCRIPTION OF THE DRAWINGS

An exemplary embodiment of the present invention will be described in detail based on the following figures, wherein.

DETAILED DESCRIPTION

Figure 1:
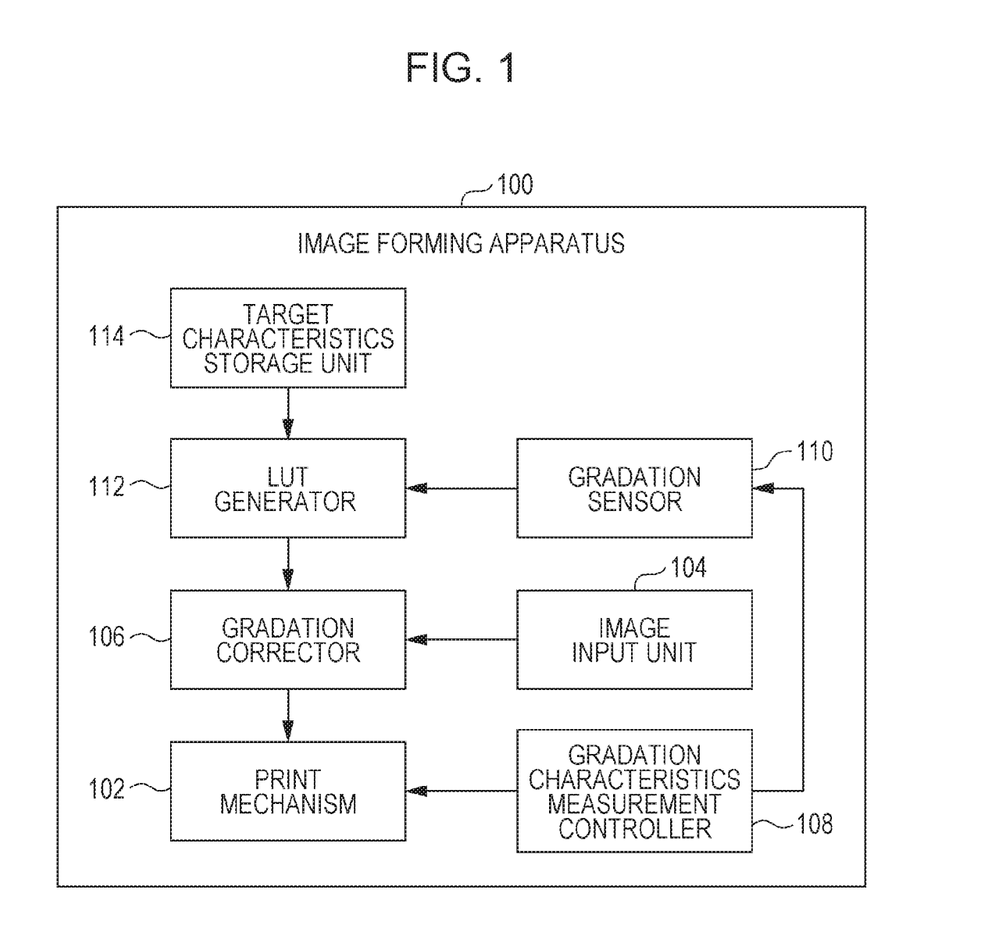
FIG. 1 illustrates an example functional configuration of an image forming apparatus to which control of the exemplary embodiment is applied.

FIG. 1 illustrates an example functional configuration of an image forming apparatus 100 to which control of an exemplary embodiment of the present invention is applied. The image forming apparatus 100 is an apparatus including a print mechanism 102 that prints images on print media such as paper sheets. Examples of the image forming apparatus 100 include a printer, a copier, and a multifunction peripheral (an apparatus that combines functions of a printer, a scanner, a copier, a facsimile, and the like). In FIG. 1, descriptions of functional elements that are included in the image forming apparatus 100 but are not closely associated with the control of this exemplary embodiment are omitted. The print mechanism 102 forms an image on a print medium, for example, by using an electrophotographic process. This is an example only, and the print mechanism 102 may be a mechanism that uses an image forming process other than an electrophotographic process (for example, an inkjet process).

Print image data that the print mechanism 102 prints on a print medium is input via an image input unit 104. The image input unit 104 receives the print image data, for example, from a scanner (not shown), an image generator that generates print image data from print data in a page description language format, or the like and provides the print image data to the print mechanism 102.

A gradation corrector 106 performs gradation correction on the print image data that is input via the image input unit 104. In the gradation correction, an input density, which is a density of a pixel (a gradation value) in the print image data, is converted to an output density by using correction information. The output density, which is a result of conversion, is input to the print mechanism 102 as a density value of a particular color. The correction information is, for example, in the form of a look-up table (LUT). The LUT stores a value of the output density for each value of the input density. Hereinafter, descriptions will be given, to facilitate understanding, of a case where information in the form of a LUT is used for the correction information for the gradation correction. The gradation correction is typically performed for each color, that is, cyan, magenta, yellow, black, and the like. In addition, in this exemplary embodiment, the print mechanism 102 has a function of printing an image by using color materials (for example, toner) of metallic colors such as silver and gold, and the gradation corrector 106 also performs the gradation correction for densities of the color materials of the metallic colors.

The gradation characteristics of the print mechanism 102 change with usage over time. Thus, the gradation characteristics of the print mechanism 102 are measured, for example, periodically or every time after a predetermined amount of printing, and the LUT for the gradation correction is updated in accordance with the measurement results. This updating process of the LUT is performed by a gradation characteristics measurement controller 108, a gradation sensor 110, and a LUT generator 112.

The gradation characteristics measurement controller 108 performs control to measure the gradation characteristics of the print mechanism 102. For example, the gradation characteristics measurement controller 108 causes the print mechanism 102 to print a test chart for measuring the gradation characteristics. A test chart is an image in which color patches that represent a color material are arranged for each color material used by the print mechanism 102. Each color patch represents one of the densities that change from zero to a maximum density in a stepwise manner for the color material. The test chart includes groups of patches that have various densities of color materials representing metallic colors (for example, silver and gold).

The gradation sensor 110 detects a gradation value of each patch in the test chart printed by the print mechanism 102. The gradation sensor 110 may be, for example, a colorimeter or an inline-type image sensor disposed in the vicinity of a sheet discharging section of the print mechanism 102.

For each color material, the LUT generator 112 generates a LUT by using the gradation values of patches that are obtained by the gradation sensor 110 and that represent different densities of the color material. Methods of generating LUTs for process colors are known, and the LUT generator 112 generates LUTs for the process colors by using such a known method.

A target characteristics storage unit 114 stores target gradation characteristics, which are ideal gradation characteristics of the print mechanism 102. Information on the target gradation characteristics is prepared and stored for each color material. The gradation characteristics of the print mechanism 102 vary in accordance with a type of print medium (for example, a type of paper). Thus, for the image forming apparatus 100 that is intended to use multiple types of print media, the information on the target gradation characteristics is prepared for each combination of a color material and a type of print medium and stored in the target characteristics storage unit 114.

As described above, the LUT generator 112 generates LUTs for the process colors by using a method (a LUT generating algorithm) similar to a known method. However, for a color material of a metallic color, such as silver, an existing method similar to the method used for the process colors does not provide a LUT that can be used for appropriate gradation correction. This will be described below with reference to the drawings.

Figure 2:
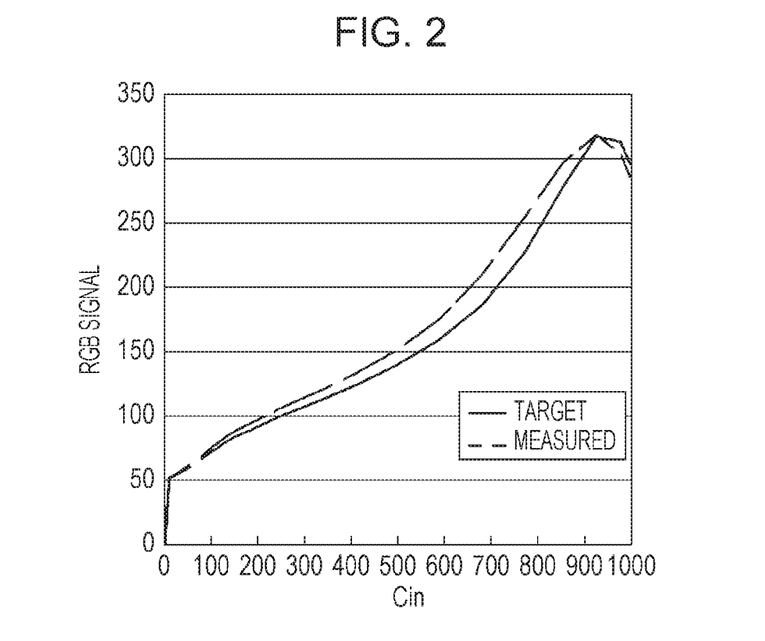
FIG. 2 is a graph illustrating gradation characteristics of silver toner of an image forming apparatus.
Figure 3:
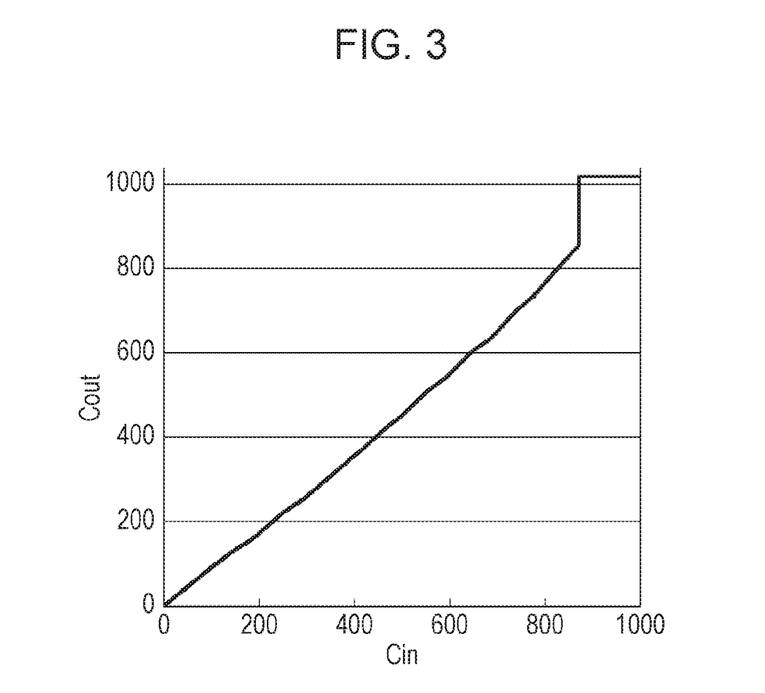
FIG. 3 is a graph depicting a look-up table (LUT) generated from gradation characteristics of silver toner by using an existing algorithm.

FIG. 2 is a graph illustrating gradation characteristics of the image forming apparatus 100 operated under a certain condition, when an image is printed on a sheet of a certain type by using sliver toner as an example of the color materials of the metallic colors. The horizontal axis of the graph denotes input density (Cin), and the vertical axis denotes a gradation value (an RGB signal representing gradation of silver), which is obtained by the gradation sensor 110. In this example, the gradation sensor 110 is a sensor detecting an RGB value of light reflected from a patch. In the graph, the solid line denoted by "Target" represents target gradation characteristics of the image forming apparatus 100 for a combination of the sliver toner and the sheet of this type, and the dashed line denoted by "Measured" represents gradation characteristics measured at a certain point of time. As illustrated on the graph, the gradation of the silver toner increases monotonically from a highlight portion (a low-density range, that is, input densities ranging from zero to a first threshold value) to an intermediate gradation portion (input densities ranging from the first threshold value to a second threshold value, which is higher than the first threshold value). However, the gradation of the silver toner attenuates (decreases) in a range equal to or higher than a certain density in a shadow portion (input densities ranging from the second threshold value to the maximum density). Such gradation attenuation in the shadow portion is not observed for any of the process colors. If a LUT for the gradation correction is generated from the gradation characteristics of the silver toner having the gradation attenuation by using an existing LUT generating algorithm developed based on an assumption that a color material has gradation characteristics showing a relatively gradual monotonic increase, as is the case for the process colors, a LUT that provides inappropriate correction is generated, as illustrated in FIG. 3. In the example depicted in FIG. 3, the output density (the vertical axis) increases rapidly to the maximum density around the input density (the horizontal axis) where the gradation attenuation begins. The output density remains at the maximum density for higher input densities.

Figure 4:
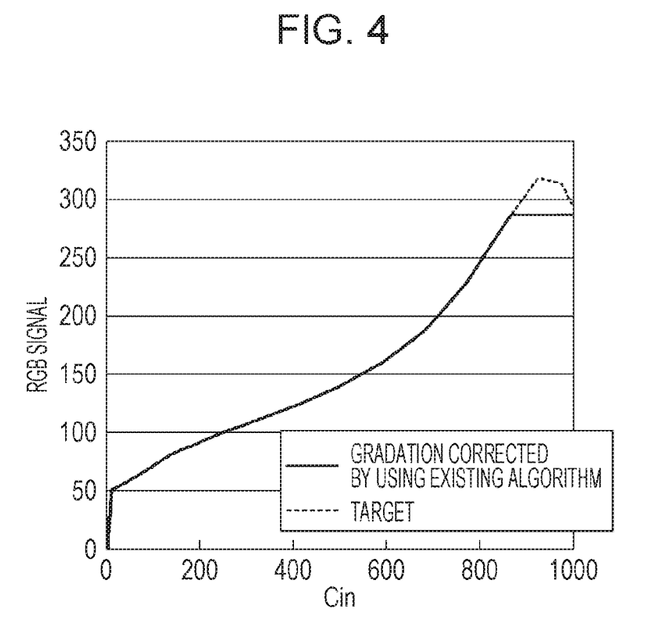
FIG. 4 is a graph depicting gradation characteristics of the image forming apparatus when gradation correction is performed by using the LUT in FIG. 3.

FIG. 4 is a graph depicting gradation characteristics of the image forming apparatus 100 when gradation correction for silver is performed by using the LUT illustrated in FIG. 3. In FIG. 4, the dotted line denoted by "Target" represents the target gradation characteristics, and the solid line represents gradation characteristics obtained when the LUT in FIG. 3 is used. As can be seen in FIG. 4, the output density is saturated and becomes constant in the shadow portion if the LUT generated by using the existing LUT generating algorithm is used for silver toner. Thus, gradation reproduction is inappropriate because the output density does not change with an increase in the input density in the shadow portion.

Thus, in this exemplary embodiment, using measurement information of gradation characteristics of color materials of metallic colors that have gradation attenuation in the shadow portion, a LUT is corrected so that inappropriate reproduction of gradation in the shadow portion is avoided or reduced. Specifically, in accordance with a predetermined rule, an input density (referred to as a correction start density) where LUT correction begins is determined based on an input density where the gradation starts to attenuate (or an input density where the gradation peaks) in measured gradation characteristics. Then, the LUT, which has been generated by using substantially the same LUT generating algorithm as that for the process colors, is corrected so as to show characteristics in which the output density increases monotonically instead of rapidly in a range of input densities from the correction start density to the maximum density.

Figure 5:
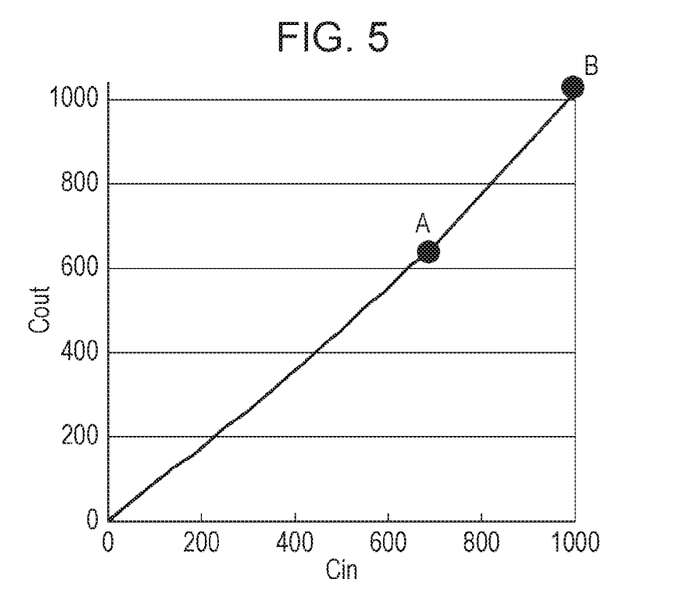
FIG. 5 illustrates a LUT corrected by using a method of the exemplary embodiment.

FIG. 5 depicts an example of a LUT thus corrected for silver toner. This example corresponds to the silver toner having the gradation characteristics (measured values) illustrated in FIG. 2. In the LUT graph illustrated in FIG. 5, data items for the input densities ranging from zero to the correction start density (point A) are generated by using substantially the same LUT generating algorithm as that for the process colors. In this example, in the range of input densities from the correction start density to the maximum density, the output densities are represented by a substantially straight line connecting points A and B. The point A corresponds to an output density that is obtained by using substantially the same LUT generating algorithm as that for the process colors at the correction start density. At the point B, the input density and the output density both reach maximum values. Gradation characteristics close to the target gradation characteristics depicted in FIG. 2 can be obtained by using the LUT thus corrected. In the example in FIG. 5, the output densities in the LUT change substantially linearly in the range of densities higher than or equal to the correction start density. This is an example only, and the output densities in the LUT may increase monotonically without a rapid change (for example, the differential coefficient is smaller than or equal to a threshold value) instead of substantially linearly.

Figure 6:
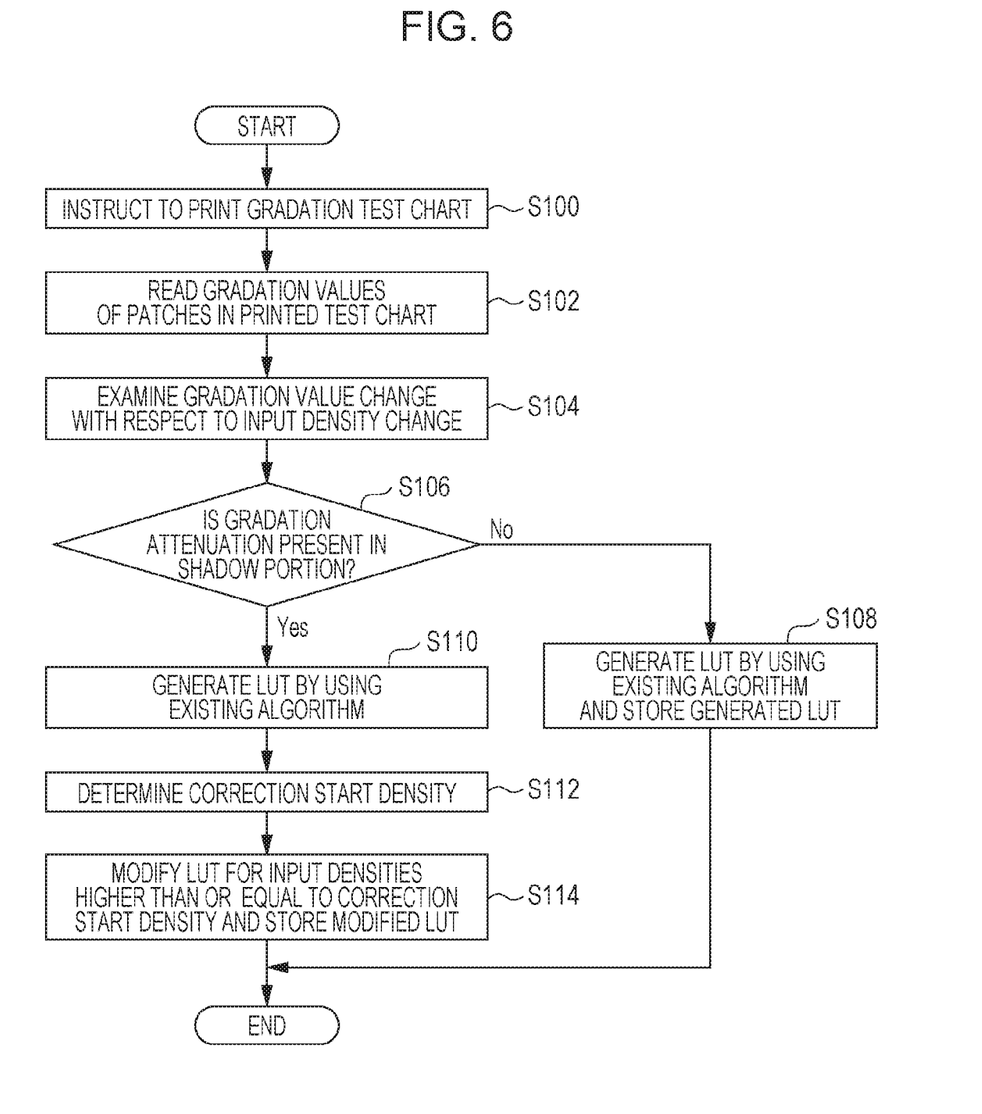
FIG. 6 illustrates procedures performed by an apparatus of the exemplary embodiment.

FIG. 6 illustrates procedures performed by the image forming apparatus 100 to generate a LUT for gradation correction of color materials of metallic colors. Upon receiving an instruction to generate a LUT for a color corresponding to a metallic color, the gradation characteristics measurement controller 108 instructs the print mechanism 102 to print a test chart that includes multiple patches of the color material of the metallic color (S100). Each of the patches represents one of the densities that change discretely. Next, the gradation characteristics measurement controller 108 causes the gradation sensor 110 (for example, an inline sensor) to read the printed test chart. A gradation value of each patch in the test chart is read by the gradation sensor 110, and a result of reading is input to the LUT generator 112 (S102). The LUT generator 112 generates gradation characteristics (refer to FIG. 2) by using the result of reading that is output from the gradation sensor 110, examines a gradation value change with respect to an input density change (S104), and determines whether gradation attenuation is present in a shadow portion of the gradation characteristics (S106). The LUT generator 112 may examine, for example, how the output density changes as the input density increases and determine that gradation attenuation is present when the output density is found to decrease in spite of an increase in the input density.

If no gradation attenuation is found in the shadow portion of the gradation characteristics in S106, the LUT generator 112 generates a LUT for gradation correction from the gradation characteristics by using the existing algorithm (i.e., substantially the same LUT generating algorithm as that for the process colors) and stores the generated LUT as a LUT for the particular color for the gradation corrector 106 (S108). Some color materials of metallic colors cause no gradation attenuation in the shadow portion depending on a type of a print medium used with the color materials for printing. In such a case, S108 is performed. If a LUT generating method for metallic colors that takes into account gradation attenuation, which will be described below in S110 to S114, is always used for every metallic color, a LUT that provides a low degree of correction accuracy may be generated for a combination of a color material and a print medium that does not cause gradation attenuation in the shadow portion. In contrast, in this exemplary embodiment, a LUT for a color material of a metallic color that has no gradation attenuation in the measured gradation characteristics is generated by using an algorithm that does not take into account gradation attenuation as is the case for the process colors.

On the other hand, if gradation attenuation is found in the shadow portion of the gradation characteristics in S106, the LUT generator 112 first generates a LUT from the gradation characteristics by using the existing algorithm (S110). The LUT generated in S110 shows a rapid increase in the output density in the shadow portion, as illustrated in FIG. 3. The LUT generator 112 also identifies an attenuation start point where gradation starts to attenuate in the gradation characteristics and determines the correction start density in accordance with the input density corresponding to the attenuation start point (S112). For example, in S112, a peak in the gradation characteristics is identified as the attenuation start point. Then, the correction start density is determined to be a density that is lower than the input density corresponding to the attenuation start point in the discrete densities represented by the patches in the test chart by a predetermined number of steps (for example, a density of a patch having a density one step lower than the input density corresponding to the peak). Next, the LUT generator 112 modifies part of the LUT generated in S110 by replacing the relation between the input density and the output density in the range of input densities higher than or equal to the correction start density with a predetermined relation that monotonically increases without a rapid change as the input density increases (for example, substantially linear relation) (S114). Then, the modified LUT is stored as the LUT for the particular color material (or the present LUT for the color material is replaced by the modified LUT) in the gradation corrector 106.

By applying these procedures, a LUT representing the relation illustrated in FIG. 5 is generated for a color material of a metallic color having gradation attenuation in the shadow portion. Then, the gradation corrector 106 performs gradation correction on image densities for the color material by using the LUT, and gradation characteristics close to the target gradation characteristics for the color material can be obtained.

Figure 7:
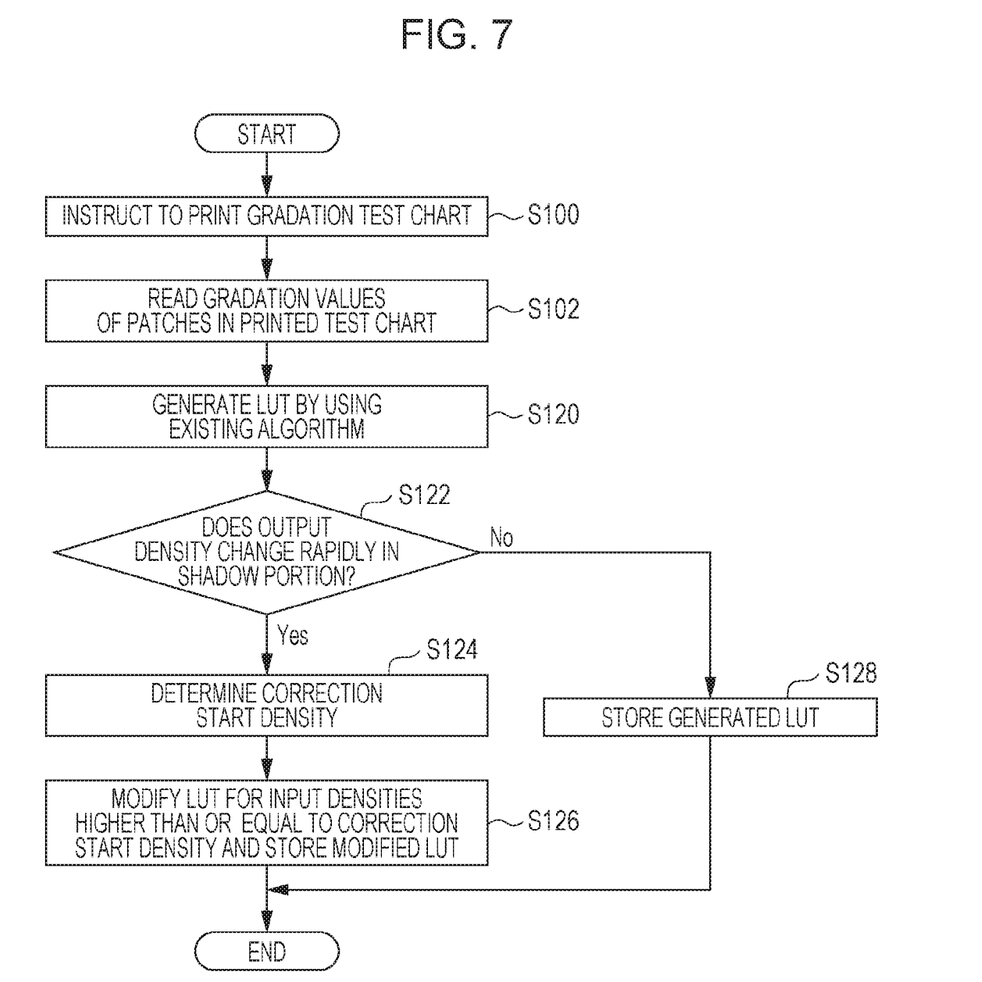
FIG. 7 illustrates another example of procedures performed by the apparatus of the exemplary embodiment.

FIG. 7 illustrates a modification of the procedures performed by the image forming apparatus 100 to generate a LUT for gradation correction of a color material of a metallic color. In these procedures, a test chart for a metallic color is printed, and a gradation value of each patch in the test chart is read under the control of the gradation characteristics measurement controller 108 in S100 and S102. Next, the LUT generator 112 obtains gradation characteristics by using the gradation values of these patches and generates a LUT by applying substantially the same LUT generating algorithm as that for the process colors to the gradation characteristics thus obtained (S120). Then, it is determined whether there is a region where the output density rapidly changes in the shadow portion of this LUT (S122). For example, if the output density, which is represented by the LUT, is differentiated with respect to the input density and a derivative is found to be between a predetermined lower limit and a predetermined upper limit, it is determined that the output density does not rapidly change. If the derivative is found to lie outside the range of the lower limit to the upper limit, it is determined that the output density changes rapidly at the input density at which the derivative lies outside the range of the lower limit to the upper limit. For gradation characteristics that have gradation attenuation, the determination result in S122 is Yes.

If the determination result in S122 is No (no rapid change is present), the LUT generator 112 stores a LUT generated in S120 in the gradation corrector 106 (S128).

On the other hand, if the determination result in S122 is Yes (a rapid change is present), the LUT generator 112 identifies an attenuation start point where gradation starts to attenuate in the measured gradation characteristics and determines a correction start density in accordance with the input density corresponding to the attenuation start point (S124). Then, the LUT generator 112 modifies part of the LUT generated in S120 by replacing the relation between the input density and the output density in the range of input densities higher than or equal to the correction start density with a predetermined relation that monotonically increases without a rapid change as the input density increases and stores the modified LUT in the gradation corrector 106 (S126).

Figure 8:
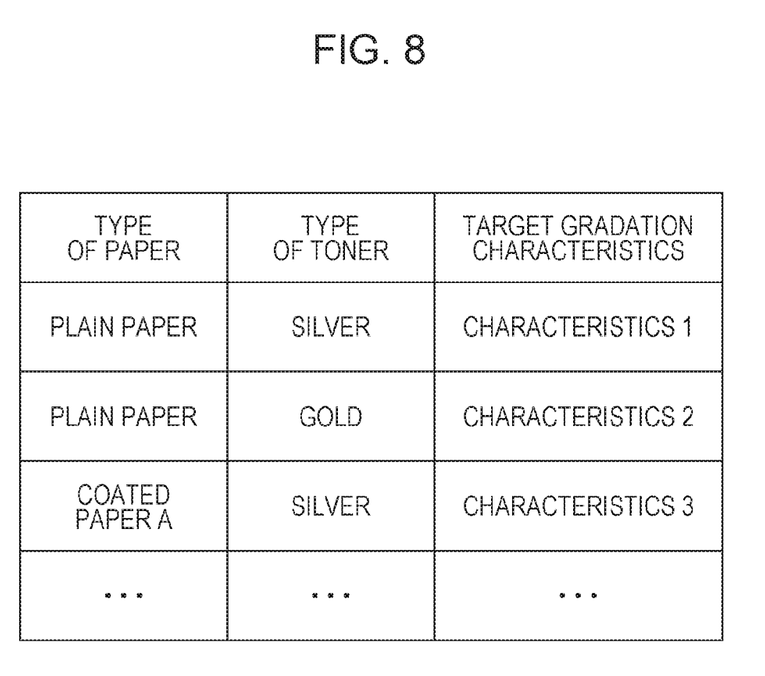
FIG. 8 illustrates an example of information stored in a target characteristics storage unit.

Next, a modification using the target characteristics storage unit 114 will be described. As illustrated in FIG. 8, the target characteristics storage unit 114 stores, for each combination of a print medium type (paper in the illustrated example) and a color material type (toner in the illustrated example), information on target gradation characteristics corresponding to the combination.

Figure 9:
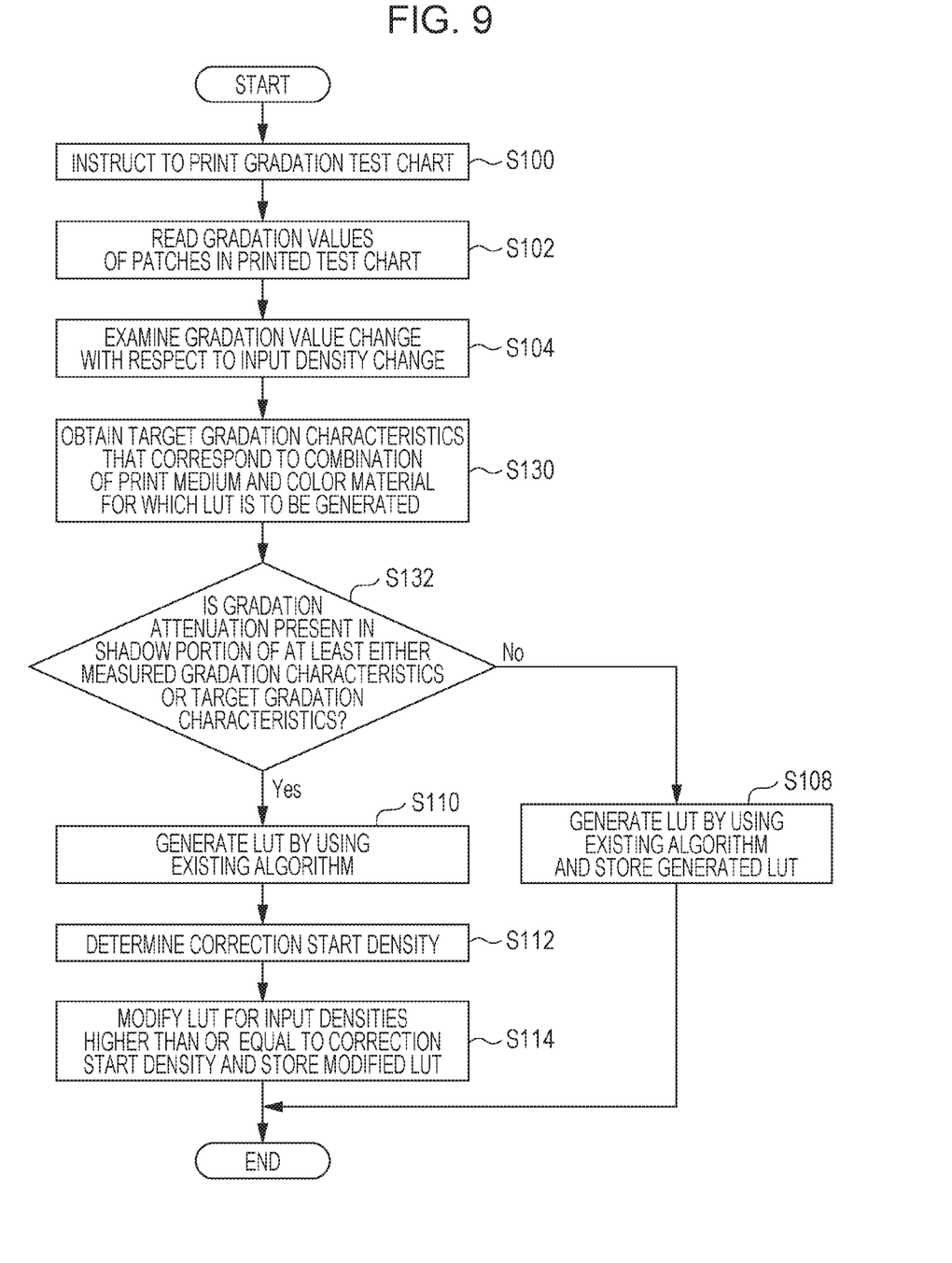
FIG. 9 illustrates a modification of procedures performed using target gradation characteristics.

FIG. 9 illustrates procedures performed by the image forming apparatus 100 to generate a LUT for gradation correction of a color material of a metallic color in this modification. In FIG. 9, procedures similar to the procedures in FIG. 6 are denoted by the same numerals, and descriptions that have already been given will be omitted hereinafter.

In the procedures in FIG. 9, after performing S104, the LUT generator 112 obtains, from the target characteristics storage unit 114, information on the target gradation characteristics that correspond to a combination of a print medium and a color material for which a LUT is to be generated (S130). Next, the LUT generator 112 examines the gradation characteristics (the measurement result), obtained as a result of S102 and S104, of the image forming apparatus 100 for the combination of the print medium and the color material and the target gradation characteristics obtained in S130. Then, the LUT generator 112 determines whether gradation attenuation is present in the shadow portion of at least either the target gradation characteristics or the measured gradation characteristics (S132).

If the determination result in S132 is No, that is, gradation attenuation is absent in the shadow portions of the measurement result of the gradation characteristics and the target gradation characteristics, the LUT generator 112 generates a LUT by using substantially the same LUT generating algorithm used for the process colors and stores the generated LUT in the gradation corrector 106 (S108).

If the determination result in S132 is Yes, the LUT generator 112 performs S110 to S114, modifies the LUT, which is generated by using substantially the same LUT generating algorithm as that for the process colors, by replacing a range of input densities higher than or equal to the correction start density with a relation showing a gradual monotonic increase, and stores the modified LUT in the gradation corrector 106.

If large errors are included in the measurement results of the patches that represent densities corresponding to the shadow portion because of the gradation sensor 110 malfunctioning or the like, gradation attenuation that should be present may not appear in the gradation characteristics obtained from the measurement result of a test chart. In such a case, a LUT that provides a high degree of correction accuracy may not be obtained when applying the procedures in FIG. 6 because a LUT is generated by using an existing algorithm (substantially the same LUT generating algorithm as that for the process colors). In contrast, even in such a case, in this modification, if gradation attenuation in the shadow portion is included in the corresponding target gradation characteristics, a LUT that provides a high degree of correction accuracy may be obtained by using the LUT generating method (S110 to S114) for metallic colors.

The exemplary embodiment of the present invention has been described above. An information processing unit (for example, the gradation corrector 106, the gradation characteristics measurement controller 108, and the LUT generator 112) of the image forming apparatus 100 as illustrated above can be realized by causing a computer to execute a program performing the functions described above. The computer has a circuit configuration in which hardware devices including a microprocessor such as a CPU; a memory (a main memory) such as a random-access memory (RAM) and a read-only memory (ROM); a controller that controls a fixed memory unit such as a flash memory, a solid state drive (SSD), and a hard disk drive (HDD); various input/output (I/O) interfaces; and a network interface that performs control for connection to a local area network or the like are connected to each other, for example, via a bus. A program that includes descriptions of processes to achieve the functions mentioned above is sent to the fixed memory unit such as a flash memory via a network, stored in the fixed memory unit, and installed in the computer. The program stored in the fixed memory unit is loaded into the RAM and executed by the microprocessor such as a CPU, thereby realizing the functional module group illustrated above.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a printer;
at least one processor configured to execute:
an obtaining unit that obtains measurement information of gradation characteristics of the printer for a color material of a metallic color; and
a generating unit that generates correction information for a print density of the color material in accordance with the measurement information,
wherein the generating unit generates the correction information by using a first method specifying that a corrected density for correcting an input density increases monotonically in a first range of input densities from a correction start density to a maximum density, the correction start density being determined in accordance with an input density at which gradation starts to attenuate in the measurement information, wherein the generating unit generates the correction information by using a second method similar to a method used for non-metallic process colors for a second range of input densities lower than or equal to the correction start density, and wherein the first method is different from the second method.

2. The image forming apparatus according to claim 1, wherein the correction start density is determined in accordance with a density at which gradation starts to decrease in the measurement information.

3. The image forming apparatus according to claim 1, wherein the correction start density is determined in accordance with a density at which gradation peaks in the measurement information.

4. The image forming apparatus according to claim 1, wherein the correction start density is determined to be a density at which gradation starts to attenuate in the measurement information.

5. The image forming apparatus according to claim 1, wherein the correction start density is determined to be a density at which gradation starts to decrease in the measurement information.

6. The image forming apparatus according to claim 1, wherein the correction start density is determined to be a density at which gradation peaks in the measurement information.

7. The image forming apparatus according to claim 1, wherein the measurement information can be represented as a graph, wherein a horizontal axis of the graph denotes input density (Cin), wherein a vertical axis of the graph denotes a measured gradation value, and wherein the correction start density is determined to be an input density at which the graph starts to attenuate.

8. An image processing apparatus comprising:
at least one processor configured to execute:
an obtaining unit that obtains measurement information of gradation characteristics of a printer for a color material of a metallic color; and
a generating unit that generates correction information for a print density of the color material in accordance with the measurement information by using a first method, wherein the generating unit generates the correction information specifying that a corrected density for correcting an input density increases monotonically in a first range of input densities from a correction start density to a maximum density, the correction start density being determined in accordance with an input density at which gradation starts to attenuate in the measurement information, wherein the generating unit generates the correction information by using a second method similar to a method used for non-metallic process colors for a second range of input densities lower than or equal to the correction start density, and wherein the first method is different from the second method.

9. A non-transitory computer readable medium storing a program that, when executed, causes a computer to execute a process comprising:
obtaining measurement information of gradation characteristics of a printer for a color material of a metallic color; and
generating correction information for a print density of the color material in accordance with the measurement information,
wherein the generating comprises generating the correction information by using a first method specifying that a corrected density for correcting an input density increases monotonically in a first range of input densities from a correction start density to a maximum density, the correction start density being determined in accordance with an input density at which gradation starts to attenuate in the measurement information,
wherein the generating comprises generating the correction information by using a second method similar to a method used for non-metallic process colors for a second range of input densities lower than or equal to the correction start density, and
wherein the first method is different from the second method.

* * * * *